United States Patent Office 3,515,959
Patented June 2, 1970

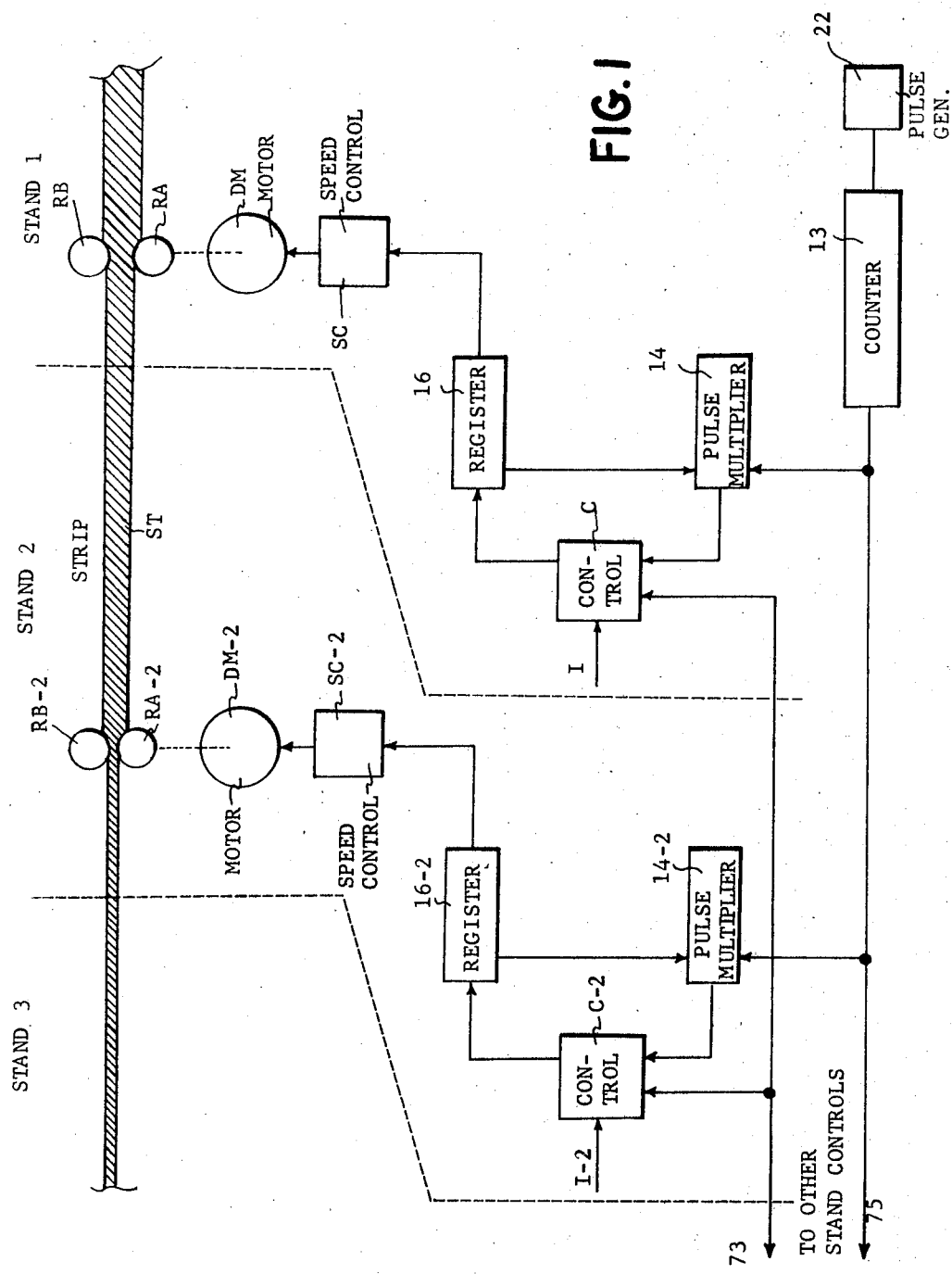

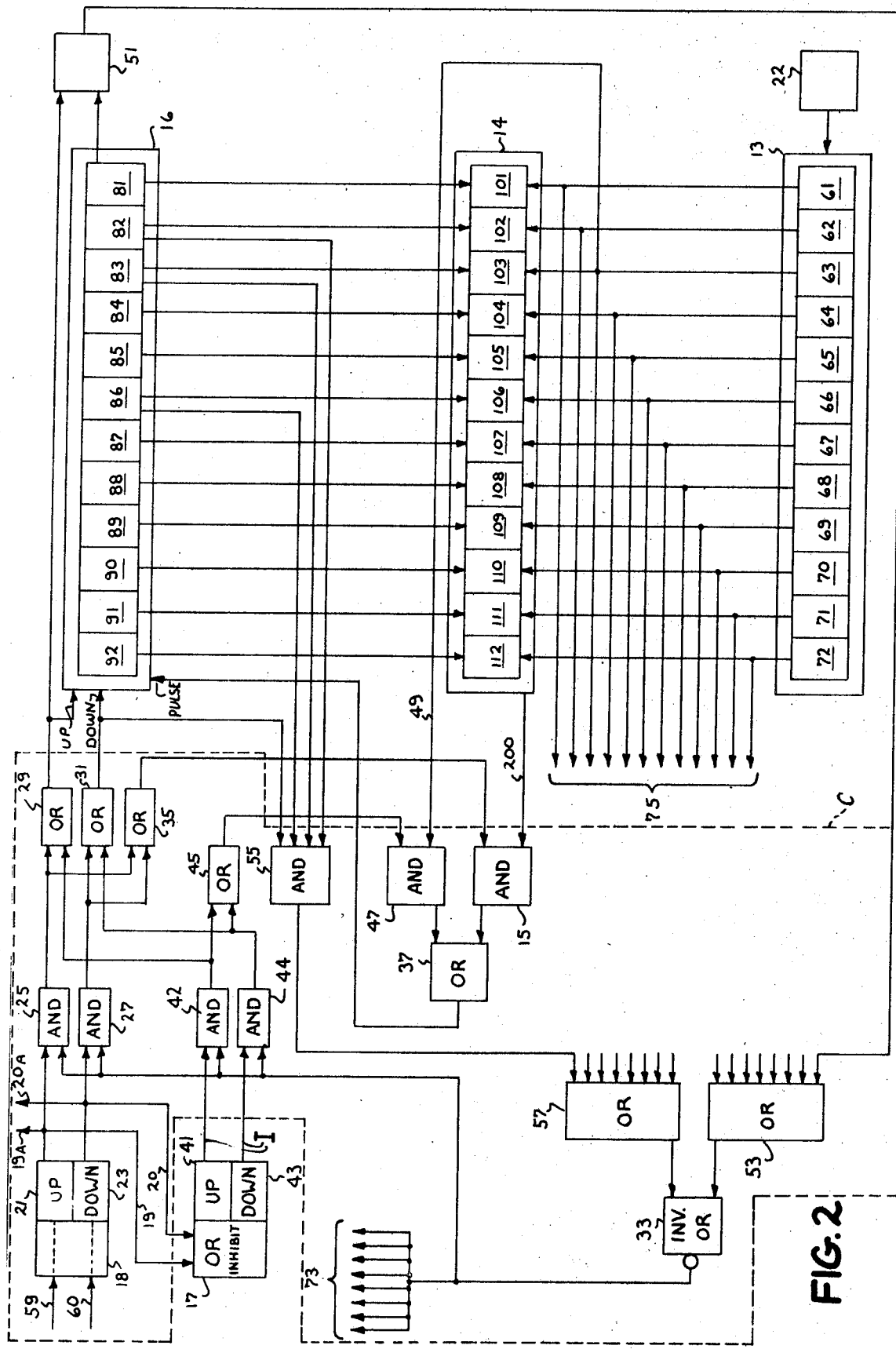

---

3,515,959
PLURAL MOTOR PROPORTIONAL SPEED CONTROL USING PULSE RESPONSIVE SPEED CONTROLS
Dale H. Jackson, Salem, Va., assignor to General Electric Company, a corporation of New York
Filed Apr. 19, 1967, Ser. No. 632,053
Int. Cl. H02p 5/46
U.S. Cl. 318—7                                      8 Claims

ABSTRACT OF THE DISCLOSURE

A control for regulating the speeds of the rolls of the stands of a multi-stand rolling mill proportionately from stand to stand using pulse responsive speed controls for each stand including a common pulse generator, a pulse frequency converter, pulse multiplier units for each of the stands, and a shift register control for governing the magnitude of the pulse frequency fed to each speed control via the multiplier units.

---

BACKGROUND OF THE INVENTION

In multi-stand rolling mills it is necessary to regulate the speeds of successive pairs of rolls so that the tension of the material passing from one stand to another is substantially constant. Since the rolling process reduces the cross section of the material, thereby increasing the length, it is necessary that the speeds of successive stands' rolls increase in order to maintain constant tension between the stands. Furthermore, in the event that the speed of the rolls of a specific stand are required to be increased, it is important that the speeds of all other stands be increased accordingly.

Previously the speeds of rolls of mill stands have been controlled manually according to data secured from prior runs of the mill and by vernier speed adjustments during the passing of the material through the mill's rolls. Speed control in this manner has not been productive in maintaining constant tension in the material, resulting in improper deformation of the material, or in some instances, in interstand loops causing "cobbles" and resulting breakdown of the mill operation. Consequently, a problem exists wherein the control of speed of successive stands in a rolling mill depends progressively upon the speeds of preceding stands, in addition to the predetermined base speed necessary to perform the desired reduction of the metal.

SUMMARY OF THE INVENTION

A speed control system for a multi-stand rolling mill to change the speed of the rolls of all mill stands proportionately when the speed of the rolls of any single stand is changed. Each motor drive of the rolls of a multi-stand mill is provided with a speed control and a speed reference register, the former being responsive to digital control pulses and the latter being responsive to the speed induced thereby. A pulse multiplier is also provided for each speed control, and is supplied with control pulses from a common pulse generator, each pulse multiplier being controlled from its corresponding speed reference register so that the pulses supplied to the speed control of any stand are equivalent to the pulse frequency of the pulse generator times the percentage of that stand's reference register speed. To change the speed of the rolls of any stand, therefore, the frequency of the pulses from the pulse generator is changed for the speed control of that stand; consequently when the speed of the rolls in any stand is changed accordingly, the speed control of each other stand will receive pulses to cause a proportionate change of speed.

BRIEF DESCRIPTION OF THE DRAWINGS

FIG. 1 is a simple diagrammatic view of the features of the invention.

FIG. 2 is a more sophisticated diagrammatic view of the invention involving the logic circuits and operational implementation of the control apparatus.

DESCRIPTION OF A PREFERRED EMBODIMENT

With reference to FIG. 1 of the drawing a piece of material ST is being reduced in cross-section by internal pairs of rolls RA–RB in Stand 1 of a rolling mill and a similar pair of rolls RA–2 and RB–2 of Stand 2 of the rolling mill in such a manner that the tension in the material ST between these pairs of rolls is maintained over a range of speeds. The rolls RA–RB are driven by Stand 1 drive motor DM, energized by a speed control SC. The rolls RA–2 and RB–2 are driven by Stand 2 drive motor DM–2 which is energized by a speed control SC–2. Other stands (not shown) in the rolling mill have identical equipment and have drive motors energized in the same manner as the example Stands 1 and 2. A pulse generator 22 common to all stands provides pulses to a digital counter 13, common to all stands, having an output 75, which produces counts and in turn applies these counts to a series of pulse multipliers, each of which operates with one of the stands. For example, pulse multiplier 14 is associated with Stand 1, pulse multiplier 14–2 is associated with Stand 2 and of the mill, and Stand 3 (not shown) has a similar arrangement. In Stand 1 the speed control SC receives a digital count from a speed reference register 16 which in turn, through control functions C, receives pulses from a pulse multiplier 14. Similarly, in Stand 2, speed control SC–2 receives a digital count from a speed reference register 16–2 which in turn, through control functions C–2, receives pulses from pulse multiplier 14–2.

The contents of each of the speed reference registers 16 and 16–2 determines the speed of the respective drive motors DM and DM–2 which are controlled by speed controls SC and SC–2, respectively. These contents may be changed by the addition or removal of counts from the registers through the application of pulses applied to the pulse input connections. It is the function of the pulse multipliers 14 in Stand 1 to eliminate a certain number of counts which are applied thereto by counter 13. Similarly in Stand 2 it is the function of the pulse multiplier 14–2 to eliminate some of the counts applied thereto by counter 13. Each of the pulse multipliers 14 and 14–2 then converts the remaining counts into pulses and applies these through control functions C and C–2 to the respective speed reference registers 16 and 16–2, thereby causing the contents of these register to change in proportion to the number of pulses received. This results in a speed change of each of the motors DM and DM–2, respectively.

The number of counts eliminated from the output of the counter in each of pulse multipliers 14 and 14–2 is determined by the contents of the associated speed reference registers 16 and 16–2, hence the contents of the speed reference register 16 determines the rate of pulses which are applied by pulse multiplier 14 to its input connection, thereby determining the rate of change of the contents thereof, and the rate of change in the speed of motor DM, controlled by the speed control SC.

Similarly the contents of speed reference register 16–2 determines the rate of pulses which are applied by pulse multiplier 14–2 to its input connection thereby determining the rate of change of the contents thereof and the rate of change in speed of motor DM–2, controlled by speed control SC–2.

Since the drive motors of the stands in a multi-stand rolling mill run at different speeds, generally increasing toward the delivery end of the mill, the contents of each of the speed reference registers such as 16 for Stand 1 and 16–2 for Stand 2 is correspondingly different. When a change in speed is required, the rate of change of speed in each of the motors will be different. For example, in Stand 1 the speed reference register contains a predetermined number representing a predetermined speed of motor DM. Stand 2 motor DM–2 must run faster, hence the contents of the speed reference register 16–2 must be higher than the contents of speed reference register 16.

Since the number of pulses applied to each speed reference register is proportional to the reference registers contents, when the change must be made, the initial number of Stand 2 is greater than those applied to the speed reference register 16 of Stand 1. This causes the contents of speed reference register 16–2 to change at a greater rate than that of speed reference register 16, which in turn causes the pulse multiplier 14–2 of Stand 2 to apply more pulses to speed reference register 16–2 than the number of pulses which are applied to speed reference register 16 by pulse multiplier 14 of Stand 1. The rate of change of the contents is therefore greater in Stand 2 than in Stand 1; and since the speed of the respective motors DM and DM–2 is determined by the contents of speed reference registers 16 and 16–2, the rate of change of speed of the motors DM–2 is greater than that of motor DM.

The control functions C and C–2 either permit or prevent the passage of pulses from pulse multipliers 14 and 14–2 to be applied to the respective speed reference registers 16 and 16–2. For the purpose of changing the speed of the entire mill, common connection 73 to all the control functions C, C–2, etc. provides that all of the stands of the mill will change speed simultaneously at a rate which is proportional to the contents of their individual speed reference registers 16, 16–2 etc. Individual speed adjustment of each of the Stands 1 and 2 may be performed by an individual stand control signal I applied to the control function C and similarly an individual speed adjustment of Stand 2 may be made by the application of an individual stand control signal I–2. Other stands of a multi-stand mill are controlled identically, each stand having individual and cascade control means. The individual stand control is used during the setup of the mill when the speed of each of the stands must be adjusted to suit the rolling conditions required of the stand, cascade control provides speed changes of the entire mill without changing the speed relationship from stand to stand.

A more sophisticated embodiment of the invention is illustrated in the circuit shown in FIG. 2, which shows an oscillator 22 continuously applying pulses to a converter 13 consisting of "trigger circuits" or "flip-flops" 61–72, each of which divides the output pulses of a preceding flip-flop by a factor of "2"—resulting, for example, in a pulse frequency from flip-flop 72 equal to the frequency of the oscillator 22 divided by 4096 since each of the aforesaid flip-flops operates in binary serial notation, feeding pulses to a composite pulse multiplier 14 consisting of a series of AND circuits and single shot multivibrators having a common output 200.

Each of the AND circuits has two input terminals so that when "binary" ONE signals are applied, a binary ONE signal is produced at the common terminal 200. Therefore, when converter 13 applies its pulses to one of the input terminals of the AND circuits 101–112 of the pulse amplifier 14 in serial fashion, the pulse multiplier will only pass pulses having a binary ONE signal upon the second input terminal of these AND circuits. A shift register 16 determines which of the AND circuits 101–112 provides the pulses; i.e., the number of pulses which appear at the output of the pulse multiplier 14, of terminal 200. The shift register 16 consists of a series of 12 flip-flops 81–92, each of which operates so that the total number contained in the shift register is either increased or decreased each time the register is fed a pulse. This pulse or a series of pulses is derived from the output of pulse multiplier 14 and applied to the pulse input connection of shift register 16 through control function C including individual stand control 17 and cascade control 18. This total number is applied to the motor speed control (not shown) where it used to control the speed of the motor (not shown).

Operation is by an individual stand control 17, or by a cascade control 18. Connections 19 and 20 apply the output of the "UP" and "DOWN" function 21 and 23 to an OR INHIBIT function of the stand control 17, thereby providing an interlock between controls 17 and 18 in which the latter has priority of control.

The output from the cascade control UP and DOWN functions 21 and 23, respectively, is applied to the input of a pair of AND circuits 25 and 27, respectively, which, if the signals to a second set of input terminals are of the correct sense, will pass the signals to the input terminals of a pair of OR circuits 29 and 31. OR circuit 29 applies its signals to the UP input of a shift register 16 and OR circuit 31 applies its signals to the DOWN input. Hence if the shift register 16 is to count up from the number which it contains, the UP function 21 of the cascade control 18 is actuated and a signal is applied to the AND circuit 25 which under the proper conditions will pass the signal onto the OR circuit 29 which then applies its output to the UP input of the shift register 16, thereby changing the shift register in the UP directoin. When pulses are applied to the input of the shift register 16, the shift register will add counts to the number already contained, until the signal is removed and pulses are stopped.

The proper conditions which will allow AND circuits 25 and 27 to pass the signal from either the UP or DOWN functions 21 and 23, respectively, are attained when a binary ONE signal from inverting OR circuit 33 is applied to the second input terminal of each of the AND circuits 25 and 27. The output from the AND circuits 25 and 27 is applied to an OR circuit 35 so that a ONE signal from either of these AND circuits applied thereto will cause the OR circuit 35 to produce a ONE signal and apply this to AND circuit 15. Having a ONE signal applied to its inputs AND circuit 15 will pass the pulses, derived from the pulse multiplier 14, to OR circuit 37, which in turn will apply these pulses to the pulse input of shift register 16.

The individual stand control 17 operates similarly to the cascade control 18 with the exception that the pulses which are ultimately applied to the shift register 16 are derived from the counter 13 rather than from the pulse muliplier 14 as is the case with the cascade control 18. Thus when either the UP or DOWN function 41 and 43, respectively, of the individual stand control 17 is actuated, the signal is applied to AND circuits 42 or 44, respectively, and providing the proper signal is applied to second input of the AND circuits a binary ONE signal will be applied to OR circuits 29 or 31, which pass this signal onto shift register 16 causing it to either add or subtract from the number contained by it, depending on whether the UP or DOWN function 41 or 43, respectively, has been actuated.

The proper signal which allows the AND circuits 42 and 44 to pass the signals is a binary one signal derived from inverting or circuit 33. The binary ONE signal from either AND circuit 42 or 44 is also applied to an OR circuit 45 which passes this signal to the input of an AND circuit 47.

Pulses derived from flip-flop circuit 63 of the counter 13 are applied to a second input of AND circuit 47 and with the binary ONE signal applied to the first input this AND circuit will apply the pulses to OR circuit 37 which in turn passes these pulses on to shift register 16. The speed at which the shift register is to add or subtract during the adjustment by means of the individual stand control 17, i.e., the speed at which pulses are applied to its pulse input, can be increased or reduced by reconnecting the input of AND circuit 17 through connection 49 to a different flip-flop circuit of counter 13. Connection is shown to the output of flip-flop circuit 63 and a change to flip-flop circuits 62 or 61 will increase the speed, and connection to any one of flip-flop circuits 64–72 will reduce the speed of addition or subtraction from the shift register 16. An overflow function is provided by AND circuit 51 as part of the shift register circuit 16 to stop additional counts from being applied to the shift register when the shift register is full, this occurs when the output of every flip-flop circuit 81–92 of the shift register 16 is a binary ONE. When this occurs the binary ONE signal output of flip-flop 81 is applied to AND circuit 51, a second input of the AND circuit 51 derives a binary ONE signal from OR circuit 29 during actuation of the UP function 21 or 41 of cascade control 18 or individual stand control 17, respectively. With the two binary ONE signals applied to its input terminals, AND circuit 51 will apply a binary ONE signal to OR circuit which in turn applies a binary ONE signal to inverting OR circuit 33 which then applies the resulting binary ZERO signal to AND circuit 25 and causes this AND circuit to turn off the signal from the UP function 21 of the cascade control 18.

The same overflow function is provided for the individual stand control UP function. The binary ONE signals applied to the AND circuit 42 by the outputs of the UP function 41 of the individual stand control 17 and the inverting OR circuit 33 will cause this AND circuit to pass a binary ONE signal to OR circuit 45 and cause counts to be accumulated in the shift register 16 through AND circuit 47 and OR circuit 37. Should, however, the ONE signal, applied to AND circuit 42 from inverting OR circuit 33, change to a ZERO signal, due to an overflow signal from AND circuit 51, then the pulses from the counter 13 would be prevented from reaching the shift register 16, hence stopping the accumulation of the counts. The point where the shift register 16 is full; i.e., when it has reached its high limit of accumulation, corresponds with the maximum speed of the motor controlled by the system. To slow down the motor it is necessary to actuate the DOWN function in either the cascade control 18 or the individual stand control 17. This causes the shift register 16 to count down by having counts subtracted from its contained number. Simultaneously the field voltage of the motor (not shown) is increased, until a point is reached where the motor has reached base speed, and continued increase of voltage applied to the motor field could damage the motor. The point where increase of the voltage, applied to the motor field is stopped, depends on the speed ratio for which the motor is designed; i.e., a 2:1 motor has a top speed which is twice as great as its base speed and a 4:1 motor has a four times speed range. Since the number contained in the shift register 16 corresponds to the speed of the motor, it becomes necessary to limit the point to which the shift register can be allowed to reduce the counts which it contains, in that beyond that point voltage to the field of the motor goes above the rating for which the motor was designed. This point is established by dividing the maximum possible count in the shift register by the speed ratio of the motor.

Hence, the maximum count attainable by the twelve bit shift register 16 is 4096, and the speed ratio of the motor is for example 2.5:1, then the low speed limit of the shift register must be set at not less than 1638 counts. For the example the figure was rounded off to 1600 and connections to the AND circuit 55 are taken from the inverse output of flip-flop circuits 82, 83 and 86 representing 1024, 512 and 64 counts, respectively, of shift register 16, totaling to 1600 counts. When the shift register 16 reaches this count, flip-flop circuits 82, 83, and 86 each produce a digital ONE signal from their inverse output terminals, which are applied to the AND circuit 55. During the actuation of the DOWN function a digital ONE signal is produced by OR circuit 31 and applied to the AND circuit 55, which, having four binary ONE signals applied to its input terminals, produces a binary ONE signal which is applied to OR circuit 57. This OR circuit passes the binary ONE signal on to inverting OR circuit 33, thereby producing a binary ZERO signal which, when applied to AND circuit 27, stops the application of pulses to the shift register 16. This then stops any further adjustment in field voltage of the motor which has hereby reached its base speed.

The signals produced by the UP and DOWN functions 21 and 23, respectively, of the cascade control 18 are applied to the cascade controls of other stands located "upstream" from the stand under discussion; i.e., let the control described be that of Stand 4 then in a six stand mill the cascade control of Stand 4 also controls the speed of the motors of the "upstream" Stands 3 through 1. The connections for the UP and DOWN functions 21 and 23, respectively, to these stands are made through conductors 19A and 20A. Equivalent connections of UP and DOWN functions from stands, which are downstream from the stand control shown; i.e., from Stands 5 and 6 in the example above, are applied to the cascade control 18 through conductors 59 and 60, respectively. Hence when the cascade control UP function of mill Stand 3 (not shown) is actuated, the controls for Stands 1 and 2 will be actuated simultaneously and adjust the speed of the respective motors accordingly.

If, at anytime during the adjustment of these stands, by cascade control, either top speed or base limits are reached, one of the OR circuits 57 and 53, depending on which limit is reached, will pass the binary ONE signal, which it receives from its overflow circuit, the equivalent of 51, or its low speed limit equivalent to AND circuit 55 to inverting OR circuit 33 which then applies the resulting binary ZERO signal to AND circuits equivalent to 25 and 27 of all stands in the mill and limits further adjustment of the stands located "upstream" from that stand from which the cascading adjustment is performed.

Connections to all stands from the inverting OR circuit 33 is performed by conductor 73.

OPERATION

During the operation of the individual stand control function the contents of the shift register is changed which causes the speed of the motor controlled by the individual stand control to change its speed by a corresponding amount. The change in both the speed of the motor and the contents of the shift register 16 are directly proportional to each other, hence, when the shift register is full the motor is at top speed and when the shift register reached its low limit the motor is at base speed.

Since in a multi-stand steel mill each of the stands runs at a different speed, with the higher speeds toward the downstream side of the mill it is apparent that during cascade control adjustment the stands which are located on the downstream side have to increase or decrease more in speed than the stands preceding them; i.e., if Stands 4 and 5 are to be adjusted in speed by for example 5% and Stand 5 is running at 400 feet per minute and Stand 4 at 300 feet per minute a 5% increase in the speed of Stand 4 is 15 feet per minute and the 5% increase in speed of Stand 5 is 20 feet per minute. Since speed of the motors is proportional to the counts contained in the shift register it follows that the shift register of Stand 4 will have to change its contents by the equivalent of 15 feet per minute and the shift register of Stand 5 will change its content by the equivalent of 20 feet per minute during the same period of time. It is therefore necessary that the change of the contents of the shift register of Stand 5 occurs at a greater rate than the change in contents of the shift register of Stand 4, hence that the pulses which are applied to the pulse terminal of the shift register of Stand 5 are of greater frequency than those applied to the shift register of Stand 4. This is accomplished by applying the pulses derived from the pulse multiplier 14 to the shift register during the adjustment by cascade function.

As has been described above the number of pulses which the counter 13 applies to the pulse multiplier 14 are modified by the pulse multiplier by the signals applied thereto by the shift register 16. When the shift register 16 is full all its output signals applied to the pulse multiplier 14 are binary ONE's, hence all the pulses applied to the pulse multiplier 14 by the counter 13 are passed by the pulse multiplier 14 and applied to the shift register 16, which causes the shift register to start to count down as soon as AND circuit 15 and OR circuit 37 permit this to occur.

As the contents of the shift register 16 changes, some of the ONE signals applied to the pulse multiplier 14 will change to ZERO signals which will cause a proportional change in the frequency output of pulse generator 14. Therefore, a lower contents of the shift register 16 will produce a lower frequency of the pulse generator output, similarly, a higher contents in the shift register will produce a correspondingly higher frequency. Since the rate of change of the shift register contents depends on the frequency of the pulses applied to its pulse input terminal and the speed of the motor is proportional to the contents of the shift register, it follows that the rate of change of the motor is proportional to the rate of change of the frequency. Therefore with high motor speed the rate of change is greater than with lower motor speeds. Thus in the example above where the rate of change in speed of Stand 5 must be greater than the rate of change in the speed of Stand 4, the requirement is satisfied by varying the frequency of applied pulses to the shift register as a consequence of its contents.

In the multi-stand steel mill where each of the stands runs at a different speed, speed control by means of the cascade function will cause a change in the speed of each of the stands in proportion to the speed at which each of the stands is running.

What is claimed is:

1. In a rolling mill having a plurality of stands including a pair of rolls at each stand through which a length of material is passed from stand to stand to be reduced in cross-section.
   (a) means for driving the rolls independently of each other;
   (b) a speed control for each of said driving means, said control being responsive to a coded signal for changing the speed of the driving means according to the code of said signal received;
   (c) a speed reference register for each of said driving means for producing said coded signal;
   (d) means responsive to said coded signal for producing a pulse train applied to said register for changing the code of said signal; and
   (e) a pulse generator common to all said pulse train producing means, said generator producing uniform pulses for conversion by said pulse train producing means whereby the speed of all drives are proportionally changed for maintaining constant tension in said material between the stands.

2. The invention claimed in claim 1 wherein said speed reference register output signal is binary coded.

3. The invention claimed in claim 1 wherein the pulse train producing means is a pulse multiplier which produces pulses in proportion to the speed of the driving means.

4. The invention claimed in claim 1 wherein the speed reference register changes its output signal at a rate proportional to its contents.

5. The invention claimed in claim 1 including means for limiting further adjustment to lower speed of the rolling mill when one of the motors being adjusted has reached its lower limit.

6. The invention claimed in claim 1 further modified to include means for preventing further adjustment to higher speed of the rolling mill when one of the motors being adjusted has reached its upper speed limit.

7. The invention as claimed in claim 1 wherein the speed of said driving means is proportional to the contents of said speed reference register.

8. The invention as claimed in claim 3 further modified through a binary counter which receives and converts said pulses to a binary coded pulse train to be applied to said pulse multiplier.

References Cited

UNITED STATES PATENTS

| | | | |
|---|---|---|---|
| 2,945,997 | 7/1960 | Kennedy | 318—341 |
| 3,184,663 | 5/1965 | Memglem | 318—341 |
| 3,237,071 | 2/1966 | McMath | 318—7 |
| 3,248,621 | 4/1966 | Carter | 318—6 |
| 3,349,308 | 10/1967 | Strand | 318—318 |
| 3,373,329 | 3/1968 | Kaiser | 318—341 |

ORIS L. RADER, Primary Examiner

A. G. COLLINS, Assistant Examiner

U.S. Cl. X.R.

318—341